(12) United States Patent
Sawauchi

(10) Patent No.: US 8,033,353 B2
(45) Date of Patent: Oct. 11, 2011

(54) CANISTER MOUNTING STRUCTURE

(75) Inventor: Yosuke Sawauchi, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 332 days.

(21) Appl. No.: 12/277,549

(22) Filed: Nov. 25, 2008

(65) Prior Publication Data

US 2009/0140014 A1 Jun. 4, 2009

(30) Foreign Application Priority Data

Nov. 30, 2007 (JP) .................................. 2007-310265

(51) Int. Cl.
*B62D 21/00* (2006.01)
(52) U.S. Cl. ........................ 180/69.4; 180/69.5; 180/274
(58) Field of Classification Search .................. 180/69.4, 180/69.5, 274; 280/834; 296/37.2
See application file for complete search history.

(56) References Cited

U.S. PATENT DOCUMENTS

| | | | | |
|---|---|---|---|---|
| 3,175,742 A | * | 3/1965 | Cadmus ...................... | 224/42.23 |
| 3,642,296 A | * | 2/1972 | Froumajou ................... | 280/834 |
| 3,811,698 A | * | 5/1974 | Glance .......................... | 280/784 |
| 4,060,270 A | * | 11/1977 | Croissant ..................... | 296/37.2 |
| 4,369,981 A | * | 1/1983 | Chiba et al. ................... | 280/834 |
| 4,423,900 A | * | 1/1984 | Sugimoto et al. ........... | 296/37.14 |
| 4,533,169 A | * | 8/1985 | Rauthmann et al. ......... | 296/37.2 |
| 4,621,822 A | * | 11/1986 | Knochelmann et al. ...... | 280/834 |
| 4,727,955 A | | 3/1988 | Honda et al. | |
| 4,793,839 A | * | 12/1988 | Hayashida et al. ............. | 96/130 |
| 4,805,581 A | * | 2/1989 | Yamada et al. ................ | 123/519 |
| 4,915,358 A | * | 4/1990 | Stallings ........................ | 254/323 |
| 5,110,177 A | * | 5/1992 | Akio .......................... | 296/187.11 |
| 5,114,184 A | * | 5/1992 | Shimomura et al. .......... | 280/784 |
| 5,195,780 A | * | 3/1993 | Inoue et al. .................... | 280/834 |
| 5,364,128 A | * | 11/1994 | Ide .................................. | 280/784 |
| 5,381,871 A | * | 1/1995 | Ohta ............................. | 180/296 |
| 5,445,404 A | * | 8/1995 | Shida et al. ............. | 280/124.116 |
| 5,687,697 A | * | 11/1997 | Ishikawa ........................ | 123/520 |
| 5,702,125 A | * | 12/1997 | Nakajima et al. .............. | 280/834 |
| 5,840,104 A | * | 11/1998 | Hashimoto et al. ............. | 96/135 |
| 5,924,734 A | * | 7/1999 | Fukagawa et al. ............. | 280/830 |
| 5,975,827 A | * | 11/1999 | Ogata ........................... | 414/463 |
| 5,992,885 A | * | 11/1999 | Fukagawa et al. ............. | 280/830 |
| 6,386,611 B1 | * | 5/2002 | Buchfink et al. .............. | 296/37.1 |
| 6,893,047 B2 | * | 5/2005 | Chou et al. .................... | 280/834 |
| 7,270,365 B2 | * | 9/2007 | Suzuki et al. ............. | 296/187.08 |
| 7,677,651 B2 | * | 3/2010 | Yamaguchi et al. ..... | 296/203.04 |
| 7,717,207 B2 | * | 5/2010 | Watanabe et al. ............ | 180/68.5 |
| 2007/0096488 A1 | * | 5/2007 | Suzuki et al. ................. | 296/37.2 |
| 2007/0246929 A1 | * | 10/2007 | Isayama et al. ............... | 280/834 |
| 2008/0252104 A1 | * | 10/2008 | Yamaguchi et al. ..... | 296/203.04 |
| 2009/0140014 A1 | * | 6/2009 | Sawauchi .................... | 224/42.12 |
| 2009/0195030 A1 | * | 8/2009 | Yamaguchi et al. ..... | 296/193.08 |
| 2010/0072786 A1 | * | 3/2010 | Koyama et al. .......... | 296/203.04 |

FOREIGN PATENT DOCUMENTS

| | | |
|---|---|---|
| JP | 63-105518 U | 7/1988 |
| JP | 5-319113 A | 12/1993 |

* cited by examiner

*Primary Examiner* — Jeffrey J Restifo
(74) *Attorney, Agent, or Firm* — Foley & Lardner LLP

(57) ABSTRACT

A canister mounting structure including: a spare tire disposed in a rear underfloor region of a vehicle body in a forward tilted position wherein a front end of the spare tire is positioned lower; a canister disposed between the vehicle body and the spare tire and fastened to an underfloor member; a fuel tank disposed in front of the spare tire; a first space formed between the spare tire and the fuel tank; and a second space formed between the canister and the fuel tank.

4 Claims, 4 Drawing Sheets

CANISTER MOUNTING STRUCTURE

BACKGROUND OF THE INVENTION

1. Field of the Invention

The present invention relates to a mounting structure of a canister installed in an automobile.

2. Description of the Related Art

In some automobiles, a spare tire is housed in a rear underfloor region of the vehicle body by use of a chain for hanging the spare tire, and a fuel tank and a canister for adsorbing vaporized fuel are disposed under the floor.

Japanese Utility Model Application Publication No. S63-105518 discloses a canister mounting structure in which a spare tire is disposed in a substantially central area in the vehicle transverse direction, a fuel tank is disposed in front of the spare tire, an exhaust pipe and a muffler are disposed on one side in the vehicle transverse direction of the spare tire, and a canister is disposed on the opposite side of the spare tire from the muffler.

SUMMARY OF THE INVENTION

However, in the above-described structure, the canister and the fuel tank are disposed away from each other, and hence a tube, which communicates the fuel tank with the canister and through which vaporized fuel flows, is required to be long. Accordingly, cost of the tube itself increases, and the number of points to be fixed of the tube increases, which deteriorates the mounting workability.

In addition, when a large spare tire and a large muffler are used in an automobile having a short rear overhang, it is difficult to secure a mounting space for a canister. As a remedy for this problem, the canister can be disposed between the spare tire and the fuel tank. However, this arrangement may cause interference between the canister and the fuel tank when the canister is pushed by the spare tire at a time of rear collision.

An object of the present invention is to provide a canister mounting structure in which a canister can be disposed in a closer position to a fuel tank and which can prevent mutual interference between the canister and the fuel tank at a time of rear collision.

An aspect of the present invention is a canister mounting structure comprising: a spare tire disposed in a rear underfloor region of a vehicle body in a forward tilted position wherein a front end of the spare tire is positioned lower; a canister disposed between the vehicle body and the spare tire and fastened to an underfloor member; a fuel tank disposed in front of the spare tire; a first space formed between the spare tire and the fuel tank; and a second space formed between the canister and the fuel tank.

BRIEF DESCRIPTION OF THE DRAWINGS

The invention will now be described with reference to the accompanying drawings wherein.

DESCRIPTION OF THE PREFERRED EMBODIMENT

Figure 1:
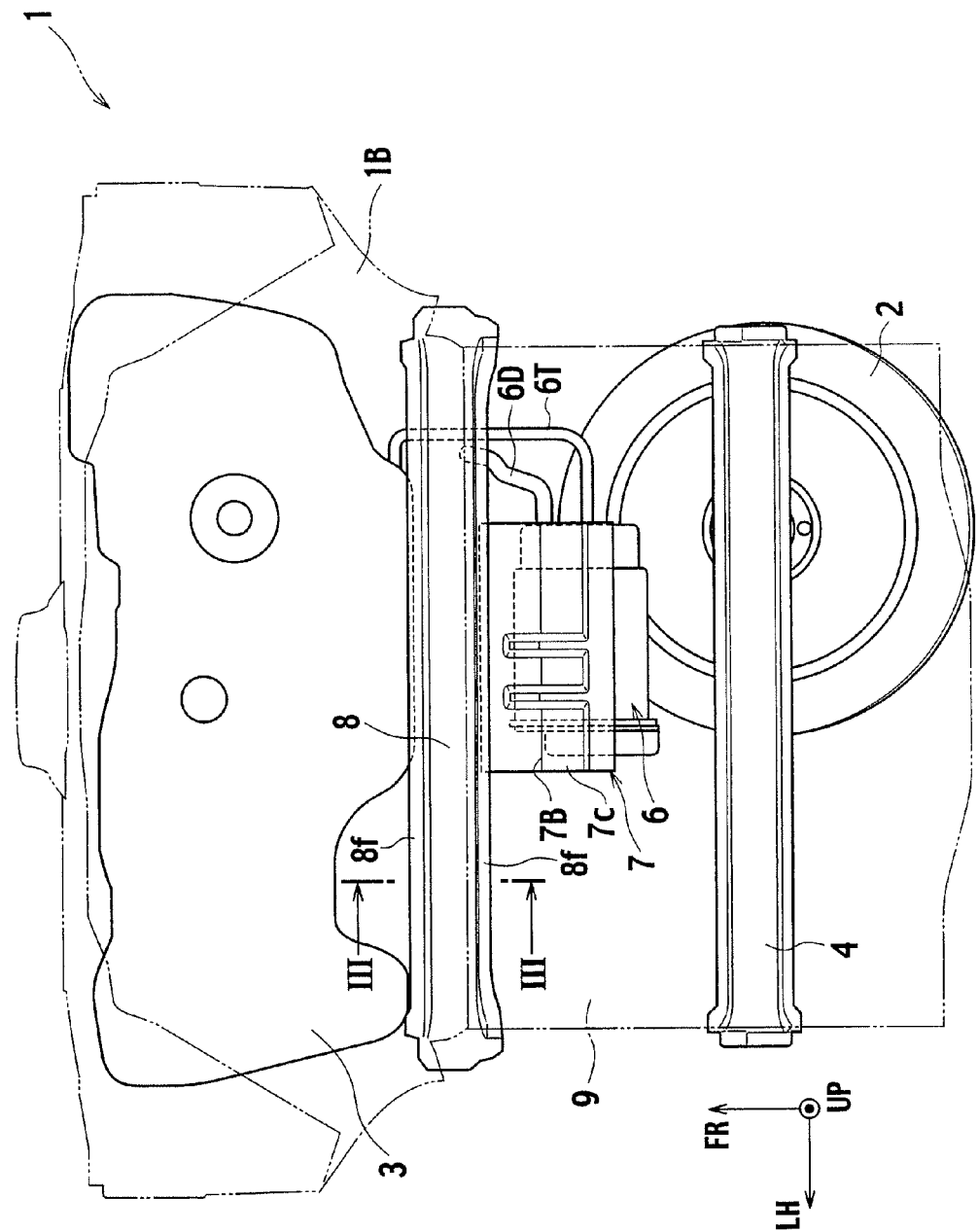
FIG. 1 is a plan view of a rear underfloor region of a vehicle body according to an embodiment of the present invention seen from above through a vehicle floor.

A preferred embodiment of the present invention will be described below in detail with reference to the drawings. In the drawings, FR denotes the front side of the vehicle or frontward/forward of the vehicle, UP denotes the upper side of the vehicle or upward of the vehicle, and LH denotes the left-hand side of the vehicle or leftward of the vehicle.

Figure 2:
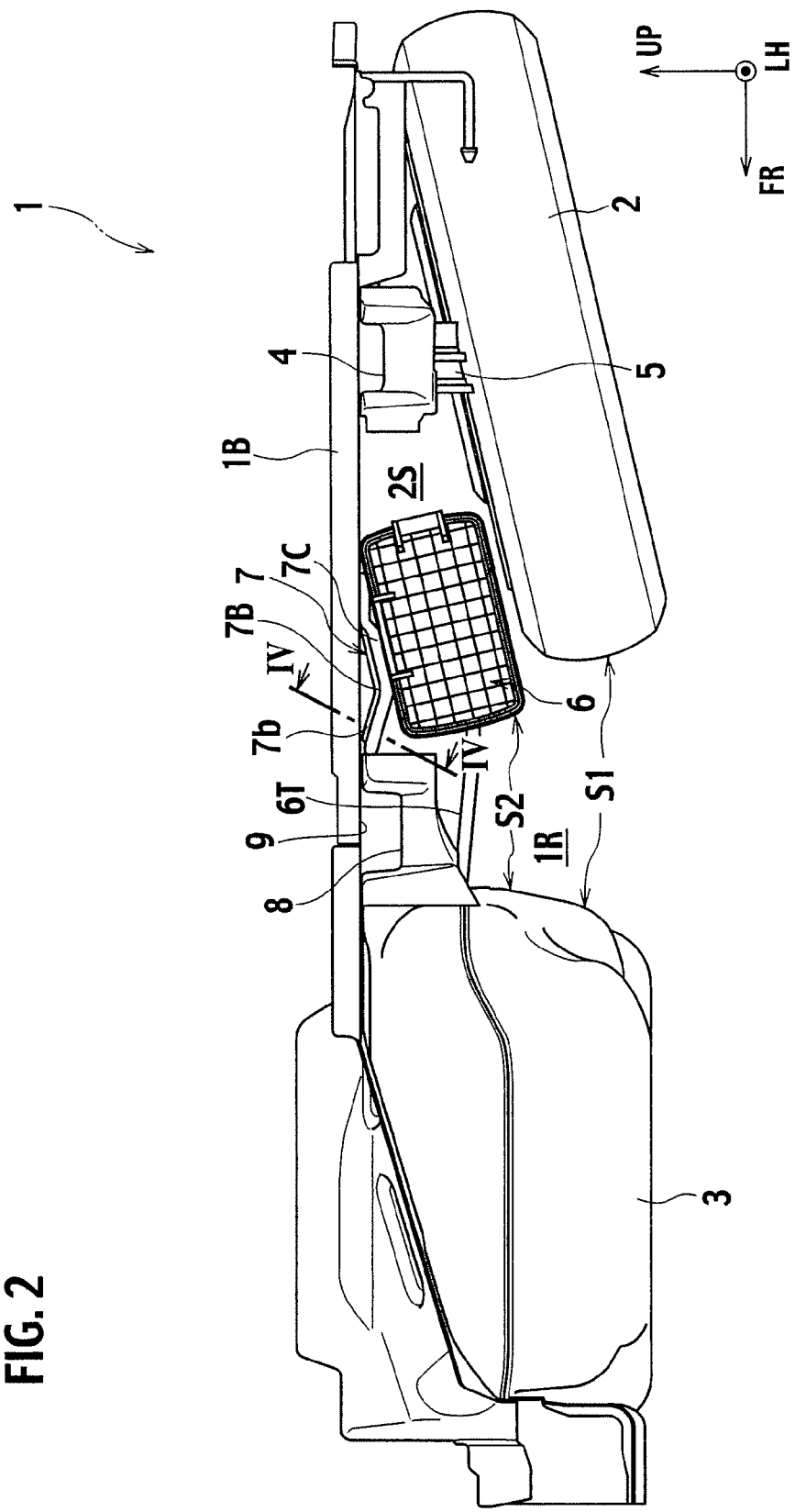
FIG. 2 is a side view of a rear part of the vehicle body according to the embodiment of the present invention.

In a vehicle 1 having a canister mounting structure according to this embodiment, in a rear underfloor region 1R of a vehicle body 1B, a spare tire 2 and a fuel tank 3 are mounted on a lower surface of the vehicle body 1B as shown in FIGS. 1 and 2. The spare tire 2 and the fuel tank 3 are disposed in a rear portion and a front portion of the rear underfloor region 1R, respectively, while being spaced from each other at a predetermined distance in a vehicle longitudinal direction. Here, a first space S1 of a predetermined length is secured between a front end of the spare tire 2 and a rear end of the fuel tank 3.

The spare tire 2 is fastened to the lower surface of the vehicle body 1B by a spare-tire-attachment bracket 4 in a forward tilted position in which a front end of the spare tire 2 is positioned lower than a rear end thereof. Between an upper surface of the spare tire 2 and the lower surface of the vehicle body 1B, an upper-side space portion 2S in a substantially wedge shape (a substantially acute-angled triangle shape when seen from a side view) is formed. The spare-tire-attachment bracket 4 is a cross member extending in a vehicle transverse direction and bridging a paired right and left rear-side members (not shown). The spare-tire-attachment bracket 4 is provided at the transversely central portion thereof with a winching device 5 which winches the center part of the spare tire 2 and secures it to the spare-tire-attachment bracket 4.

As shown in FIG. 1, the fuel tank 3 has a size substantially corresponding to the entire right-to-left width (substantially the entire width in the vehicle transverse direction) of the underfloor space. The fuel tank 3 is provided with a canister 6 for adsorbing vapors of fuel in the tank. The canister 6 has a substantially rectangular shape in a cross section perpendicular to the vehicle transverse direction while having a box form as a whole. An upper-side internal space of the fuel tank 3 and the canister 6 communicate with each other by a main tube 6T joined to an end in the vehicle transverse direction of the canister 6. In addition, a drain tube 6D is also joined to the same end of the canister 6.

In this embodiment, the canister 6 is disposed in the upper-side space portion 2S above the spare tire 2 in a forward tilted position, in which a front end of the canister 6 is positioned lower, substantially parallel with the spare tire 2 (in such a state that a top face and a bottom face of the canister 6 are substantially parallel to the upper surface of the spare tire 2). The canister 6 is provided adjacent to the spare tire 2 with a predetermined space therebetween in the vehicle longitudinal direction, and a second space S2 of a predetermined length is secured between a front end of the canister 6 and the rear end of the fuel tank 3. Here, the second space S2 is positioned above the first space S1.

The canister 6, between the spare tire 2 and the fuel tank 3 disposed in the rear underfloor region 1R of the vehicle body 1B, is attached to a cross member 8 serving as an underfloor member and the lower surface of the vehicle body 1B by a canister-attachment bracket 7. The cross member 8 extends in the vehicle transverse direction, and is disposed adjacent to and in the rear of the fuel tank 3 to bridge paired right and left rear-side members (not shown). The canister-attachment bracket 7 extends rearward from a rear edge of a transversely central portion of the cross member 8, and a rear end of the canister-attachment bracket 7 is attached to the lower surface of the vehicle body 1B. The middle of the canister-attachment bracket 7 in the vehicle longitudinal direction is bent to have a substantially "V" shape forming a downward convex in a cross section perpendicular to the vehicle transverse direction. In addition, the canister-attachment bracket 7 includes a rear half 7c in the rear of a thus formed bent portion 7B, which has a lower surface tilted at a predetermined angle with respect to the lower surface of the vehicle body 1B (an angle at which the lower surface of the rear half 7c is to be substantially parallel to the upper surface of the spare tire 2). The canister 6 is attached to the lower surface of the rear half 7c. By setting the angle of the rear half 7c, the forward tilted position of the canister 6 is can be provided more easily and more reliably.

Figure 3:
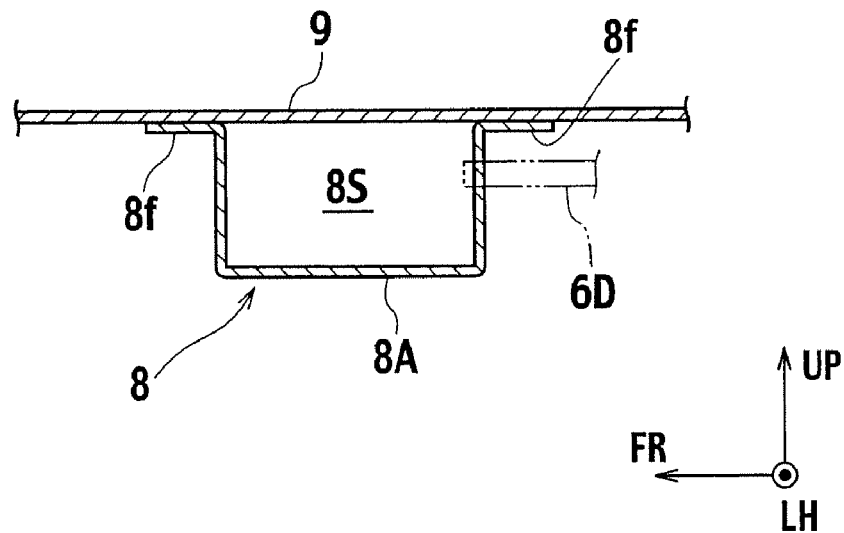
FIG. 3 is a cross-sectional view taken along a line III-III in FIG. 1.

As shown in FIG. 3, the cross member 8 includes a hat-shaped cross-section member 8A which has an upwardly opening hat shape in cross section perpendicular to the vehicle transverse direction and which includes substantially horizontally extending paired flanges 8f provided at the ends of the hat-shaped cross-section member 8A in the vehicle longitudinal direction, respectively. The cross member 8 has a hermetically-closed cross section formed by joining the hat-shaped cross-section member 8A to a bottom surface of the floor panel 9 serving as an underfloor flat-plate member. Here, the drain tube 6D of the canister 6 communicates with an internal space 8S of the cross member 8, so that the internal space 8S is effectively used as a drain.

In this embodiment, a front edge of the canister-attachment bracket 7 is fixed to a bottom surface of the rear-side flange 8f of the cross member 8 by spot welding. A water blocking structure for preventing water invasion into the cross member 8 is provided to a portion where the canister-attachment bracket 7 and the cross member 8 are joined.

To securely seal the internal space 8S of the cross member 8 serving as a drain, sealing material is applied to the portions where the floor panel 9 and each of the flanges 8f are joined. However, the sealing material cannot be applied to the portions to which the canister-attachment bracket 7 is fixed by spot welding.

In this embodiment, however, the canister-attachment bracket 7 has a shape of protruding downward at the bent portion 7B as shown in FIG. 2. Accordingly, the water blocking performance against water splash and the like from the rear underneath is enhanced compared to the case of having a horizontal flat shape without bending. Moreover, as shown in FIG. 1, the canister-attachment bracket 7 has substantially the same width as the width of the canister 6 in the vehicle transverse direction, from its front edge attached to the flange portion 8f of the cross member 8 to the rear end thereof. This large width also contributes to an increase in the water blocking performance.

Figure 4:
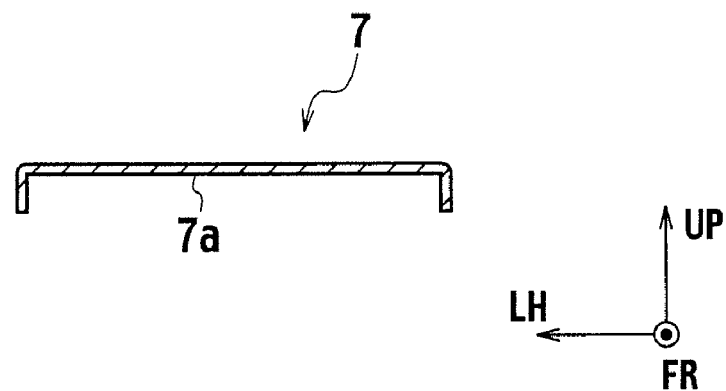
FIG. 4 is a cross-sectional view taken along a line IV-IV in FIG. 2.

Furthermore, as shown in FIG. 4, the canister-attachment bracket 7 includes a bottom plate 7a extending substantially horizontally in a cross section perpendicular to the vehicle longitudinal direction. This bottom plate 7a provides water blocking performance against water splash and the like from the front underneath. Here, transversely outer edges of the bottom plate 7a are bent downward to form side walls 7b having relatively low height. Accordingly, the canister-attachment bracket 7 has a flat reverse "U" shape in a cross section perpendicular to the vehicle longitudinal direction.

Thus, in a canister mounting structure according to this embodiment, the canister 6 is housed in the upper-side space portion 2S formed by the spare tire 2 in a forward tilted position. Thereby, the canister 6 and the fuel tank 3 can be arranged relatively close to each other. Accordingly, the main tube 6T for introducing vaporized fuel from the fuel tank 3 to the canister 6 can be relatively short. Consequently, reduction in cost and weight of the main tube 6T can be achieved. In addition, a reduction thus achieved in the number of portions to be fixed of the main tube 6T improves the attachment workability.

Moreover, by disposing the canister 6 in the upper-side space portion 2S formed by the spare tire 2 in a forward tilted position, layout efficiency of components in the underfloor space can be enhanced. Thereby, a muffler (not shown) can be designed to be larger, and noise/vibration performance can be also improved. This structure is particularly effective in the use for a vehicle having a short rear overhang.

Furthermore, in this embodiment, the drain tube 6D of the canister 6 communicates with the internal space 8S of the cross member 8 which is close to the canister 6. Accordingly, the internal space 8S can effectively be used as a drain of the canister 6, while reduction in the length of the drain tube 6D can be achieved.

Figure 5:
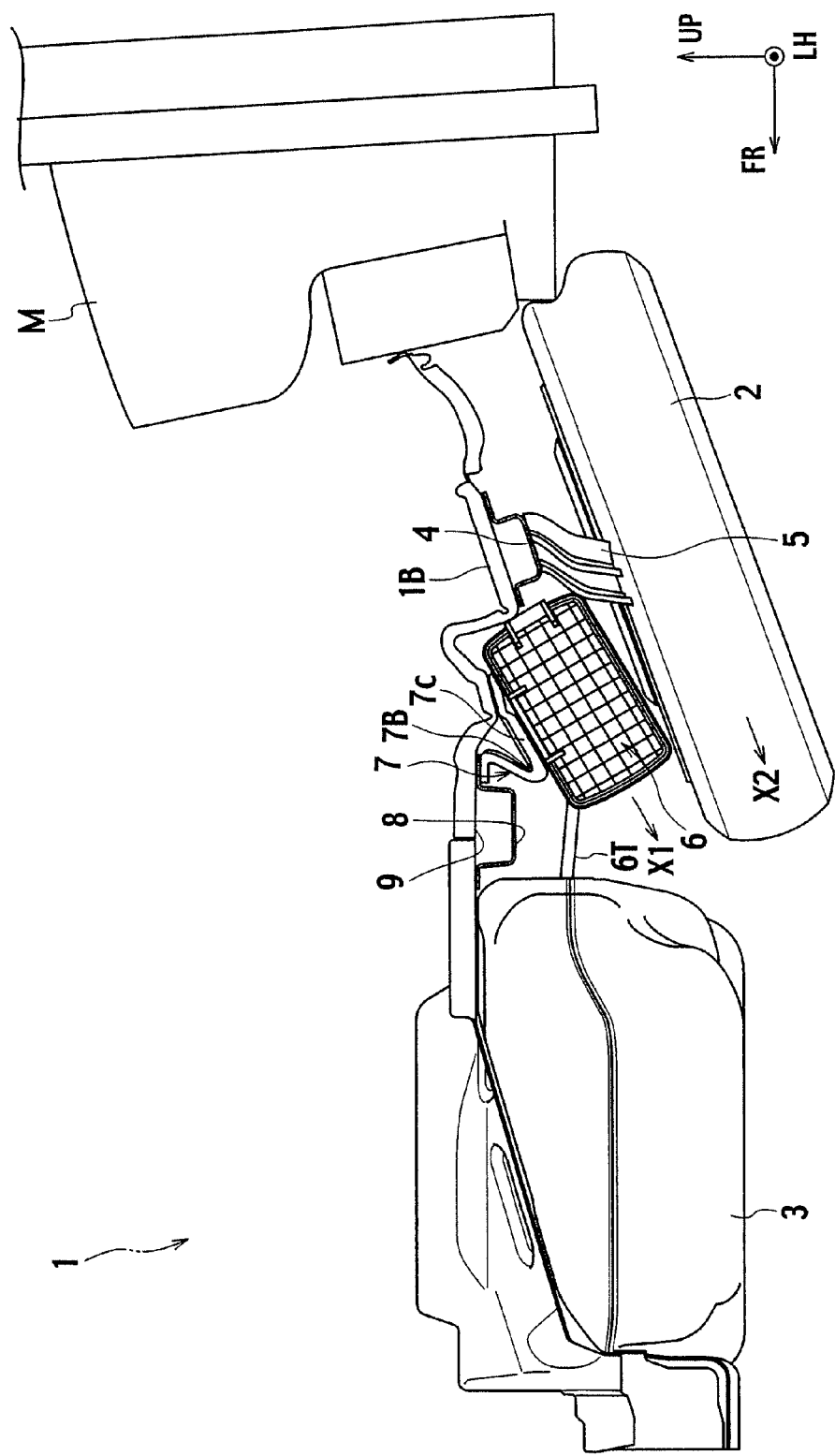
FIG. 5 is a side view showing an example of deformation of the rear underfloor region of the vehicle body according to the embodiment of the present invention at a time of rear collision.

FIG. 5 is a side view of the rear underfloor region at a time of rear collision. At a time of rear collision, for example, when a vehicle M collides with the vehicle 1 from the rear side of the vehicle 1, or when the vehicle 1 collides with an obstacle placed at the rear of the vehicle 1 when reversing, the spare tire 2 is pushed forward as shown in FIG. 5.

In this embodiment, the canister 6 is disposed in the upper-side space portion 2S in a forward tilted position substantially parallel with the spare tire 2. Accordingly, even when pushed forward due to a rear collision, the spare tire 2 slides under the canister 6, moving along the bottom face of the canister 6. Thus, this structure prevents interference of the spare tire 2 with the fuel tank 3. This structure also prevents the canister 6 from being pushed forward by the spare tire 2, and thus prevents the canister 6 from interfering with the cross member 8 or the fuel tank 3.

When the spare tire 2 is further pushed forward due to the collision, the vehicle body 1B (floor panel 9) deforms further, the canister 6 moves to the second space S2 in front of the canister 6 (as shown by arrow X1 in FIG. 5), and the spare tire 2 moves to the first space S1 (as shown by arrow X2 in FIG. 5). Since the canister 6 is disposed in a forward tilted position in this embodiment, the canister 6 slides under the cross member 8. In this way, the canister 6 moves in a direction less likely to have interference with the cross member 8 and the fuel tank 3.

Moreover, in this embodiment, the canister-attachment bracket 7 is formed to have a substantially "V" shape having a downward convex at the bent portion 7B. Accordingly, when the canister-attachment bracket 7 is subjected to a collision load, the deformation of the canister-attachment bracket 7 can start from the bent portion 7B. Thereby, the impact absorbing property thereof can be increased, and the performance for protecting the canister 6 can also be increased. In addition, when having a bent portion in a substantially "V" shape forming a downward convex, the rear half 7c of the canister-attachment bracket 7, positioned rearward of the bent portion, can be given a large forward-tilting angle as shown in FIG. 5. This can, more securely, prevent the interference of the canister 6 with the cross member 8 and the fuel tank 3.

Furthermore, in this embodiment, the water-blocking structure is provided by the canister-attachment bracket 7 having the substantially "V" shape and the large width, the side walls 7c, and the like. This water-blocking structure can prevent water invasion into the cross member 8 from the portion where the canister-attachment bracket 7 is joined to the flange 8f of the cross member 8. Thereby, water invasion from the cross member 8 to the canister 6 through the drain tube 6D can be prevented.

Moreover, in the portion provided with the water-blocking structure, sealing material to be applied around the cross member 8 can be omitted, whereby the labor for applying sealing material is reduced, and the amount of sealing material to be used can be reduced.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2007-310265, filed on Nov. 30, 2007, the disclosures of which is expressly incorporated herein by reference in its entirety.

What is claimed is:

1. A canister mounting structure comprising:
   a spare tire disposed in a rear underfloor region of a vehicle body in a forward tilted position wherein a front end of the spare tire is positioned lower than a rear end of the spare tire;
   a canister disposed between the vehicle body and the spare tire and fastened to an underfloor member, the canister being in a forward tilted position, wherein a front end of the canister is positioned lower than a rear end of the canister, substantially parallel with the spare tire;
   a fuel tank disposed in front of the spare tire;
   a first space formed between the spare tire and the fuel tank; and
   a second space formed between the canister and the fuel tank.

2. The canister mounting structure according to claim 1, wherein:
   the underfloor member is a cross member disposed in a rear of and adjacent to the fuel tank, and
   the canister is attached to a rear side of the cross member with a canister-attachment bracket disposed between the canister and the rear side of the cross member, the canister-attachment bracket bent in a downward convex shape.

3. The canister mounting structure according to claim 2, wherein:
   the cross member has a closed cross section formed by joining a member having a hat-shaped cross-section with flanges on both sides, to an underfloor, plate member, and
   a drain tube of the canister communicates with an interior space of the cross member.

4. A canister mounting structure comprising:
   a spare tire disposed in a rear underfloor region of a vehicle body in a forward tilted position wherein a front end of the spare tire is positioned lower than a rear end of the spare tire;
   a canister disposed between the vehicle body and the spare tire and fastened to an underfloor member;
   a fuel tank disposed in front of the spare tire;
   a first space formed between the spare tire and the fuel tank; and
   a second space formed between the canister and the fuel tank,
   wherein a cross member fastened to the canister has a closed cross section formed by joining a member having a hat-shaped cross-section with flanges on both sides, to an underfloor plate member, and
   wherein a drain tube of the canister communicates with an interior space of the cross member.

* * * * *